P. I. ANDERSON.
DEVICE FOR MAKING TIRES.
APPLICATION FILED SEPT. 23, 1919.
1,359,779.
Patented Nov. 23, 1920.
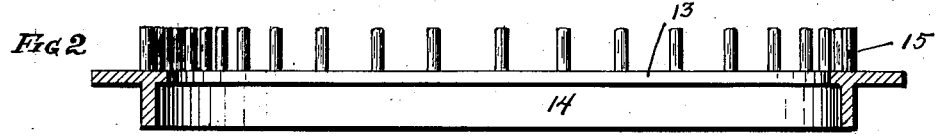
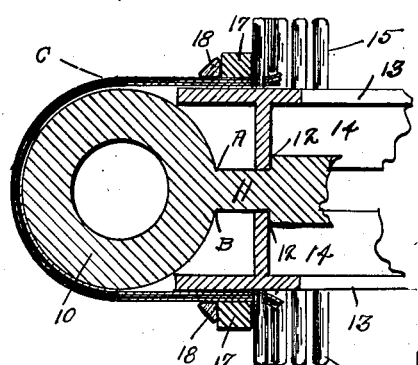
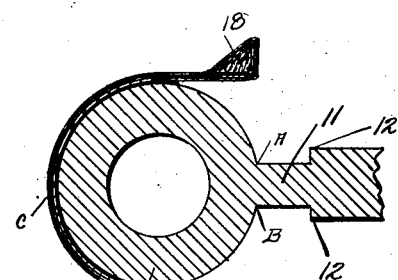
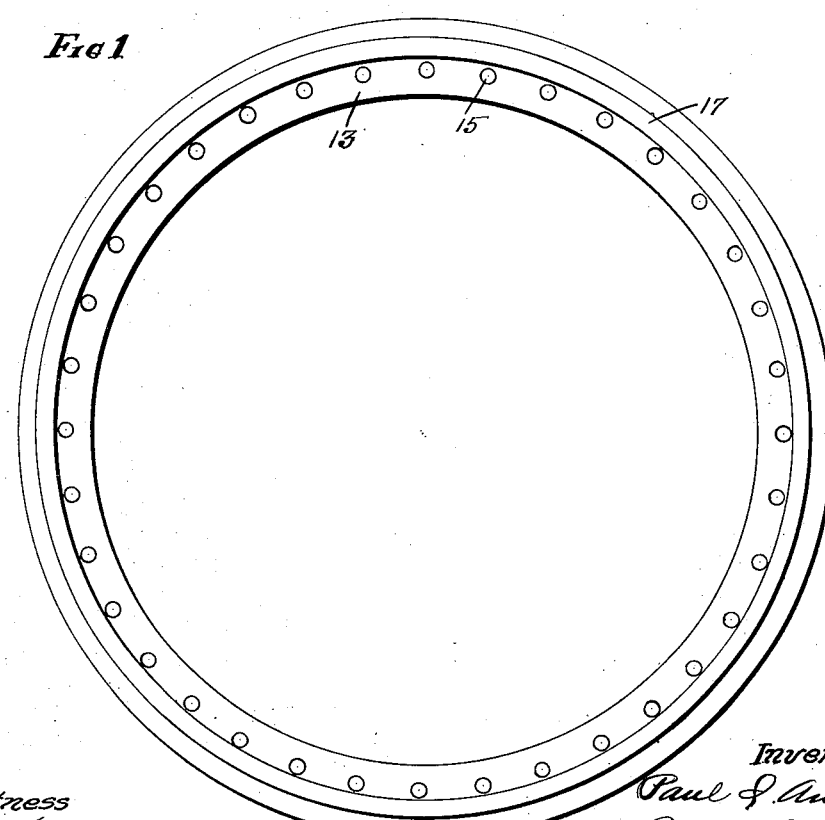

UNITED STATES PATENT OFFICE.

PAUL I. ANDERSON, OF DES MOINES, IOWA.

DEVICE FOR MAKING TIRES.

1,359,779. Specification of Letters Patent. Patented Nov. 23, 1920.

Original application filed January 28, 1919, Serial No. 273,663. Divided and this application filed September 23, 1919. Serial No. 325,776.

*To all whom it may concern:*

Be it known that I, PAUL I. ANDERSON, a citizen of the United States, and a resident of Des Moines, in the county of Polk and State of Iowa, have invented a certain new and useful Device for Making Tires, of which the following is a specification.

The object of my invention is to provide a device of simple, durable and inexpensive construction for use in making pneumatic tire casings, both of the cord and fabric types.

More particularly it is my object to provide in combination with a core member of the commonly used type, having the annular casing mold and the frame device within the outline of the core proper for supporting the core proper, which frame is divided into shoulders spaced from the bead lines on the core, annular ring devices comprising a flat ring having a flange extending downwardly when the ring is horizontal and adapted to fit against one of said shoulders, said ring being one over which the fabric or cords may be stretched for permitting the construction of the tire, so that when the bead is completed and the mold is horizontal, the fabric at the side of the tire casing will be substantially horizontal and the bead will be directly above the bead line of the core.

With these and other objects in view my invention consists in the construction, arrangement and combination of the various parts of the device, whereby the objects contemplated are attained as hereinafter more fully set forth, pointed out in my claim, and illustrated in the accompanying drawings, in which:

Figure 1 shows a top or plan view of my improved ring with a bead templet installed thereon.

Fig. 2 shows a vertical, sectional view through the same.

Fig. 3 shows a vertical, sectional view through one side of the mold, showing two rings installed thereon and showing the casing in process of construction.

Fig. 4 shows a similar, sectional view of a position of the core and a completed casing illustrating the position of the casing parts, when the casing construction is finished and is ready for the mold; and Fig. 5 shows a sectional view of a modified form of the ring.

In the accompanying drawings, I have used the reference numeral 10 to indicate generally the core proper, comprising an annular member, cylindrical in cross section having the supporting frame 11, by which the core may be supported for universal movement on a suitable support.

It may be noted that at capital "A" and capital "B" are what is called by tire makers, the bead lines of the core and spaced radially inwardly therefrom, the frame 11 is provided with shoulders 12, which coact with the mold in properly centering the mold and core with relation to each other during the molding process.

For convenience of description, I shall describe the parts of my device in the operation of the process used therein, as though the core were standing continually, unless otherwise mentioned, in horizontal position. But it is of course understood that cores of this kind are mounted for free universal movement.

The great object of my invention is to provide the combination of such a core with a ring, hereinafter more fully described, which core and ring may be used in the making of a casing in such a way that the fabric or cords may be stretched when the core is radially horizontally inwardly away from the mold, and so that a bead may be built up, which will be spaced vertically from the bead line, so that after the casing has been completed and the mold is closed over the casing and the fabric or cords will be stretched in forcing the bead toward the bead line for preventing any wrinkling or buckling of the fabric or cord.

My improved ring comprises a flat annular ring 13, having on its under surface when it is horizontally arranged as shown in Fig. 2 between its outer and inner edges, a downwardly extending flange 14 arranged when the ring is placed on the core to have its lower end rest on the frame 11, adjacent to the shoulder 12.

The fabric or cords may then be stretched over the core member 10 and pulled horizontally away from the core member, as illustrated in Fig. 3, over the ring 13. The fabric may be anchored on the ring by pulling it over the ring and may be anchored on the upwardly extending pins 15, if such pins are desired, or by means of cement.

In Fig. 5, I have shown a slightly modified form of the ring, having on its upper surface a rib 16. In different forms of the ring, the pins 15 or the rib 16 serve as a gage for a bead templet 17.

In making a tire with my device, I personally use only one ring. I place a portion of the fabric over the core and stretch it on over the ring. After the proper portion of the fabric has been thus placed in position, the templet is set as illustrated for instance in Fig. 3, and the bead 18 is placed in position adjacent to the templet. I preferably then take away the templet and roll the fabric over the bead.

The ring is then removed and the core inverted and the same process carried out on the other side of the casing. After the bead has been placed in position, the ring may be entirely removed and the bead will hold the fabric standing in the position illustrated in Fig. 3.

It will be noted that by the use of the ring, as mentioned above, the bead on the casing will have been located directly above the bead line. After the setting of the bead on both sides of the casing, the casing is completed as illustrated in Fig. 4, and is ready for the mold.

On account of the location of the bead, it will be seen that when the bead is set it will then be necessary to stretch the fabric or the cords, as the case may be, somewhat when the mold is placed over the core, in order to force the bead to the bead line. This is true, because the distance from the point "C" (see Fig. 3) to the bead is less than the distance from the point "C" to the bead line "A" where the bead will rest when the core with the casing thereon is finally placed in the mold.

This stretching of the fabric does away with the wrinkling or buckling, which causes one of the great inconveniences and problems in tire manufacture.

The use of my ring constructed substantially as here shown in connection with a core of the kind herein mentioned, makes it a simple and comparatively easy matter for the tire manufacturer to properly locate the bead for accomplishing the desirable purpose mentioned.

It may be mentioned in this connection, that it is a very difficult matter to build a tire, so as to avoid any such wrinkling or buckling of the fabric. It is a common process of tire manufacturer's to stretch the fabric down over the iron core and to hold the edges of the casing in position by cement, but this is a more difficult process for the tire maker, than pulling the fabric inwardly horizontally as substantially shown with my ring, using the pins herein described or cement for holding the fabric in position during the finishing process.

With my ring several plys of fabric may be placed on at once, which can not be done with the other processes of construction mentioned.

My ring may be readily used either with cord or fabric tire manufacture, and will make it possible to fit the bead in the proper position in all cases.

The rings may be made in standard sizes for different diameters of tires, and for different sizes of tires. It will of course be understood that the total diameter of the ring and the length of the flange 14 must be proper for the size of tire which is to be made. If the flange 14 should be short, the fabric would not only be stretched horizontally, but would be pulled inwardly toward the core frame, which would prevent the securing of the maximum stretching of the fabric when the mold was placed on the core.

It is of course understood that the core during the operation of making the tire is swung to a great many variety of positions.

I use my ring with the ordinary bead and also with the ordinary cores and mold commonly in use.

Some changes may be made in the construction and arrangement of my device without departing from the essential features and purposes of my invention, and it is my intention to cover by my claim any modified forms of structure or use of mechanical equivalents which may be reasonably included within its scope.

I claim as my invention:

The combination of a core having an annular core proper, substantially cylindrical in cross section, and a central frame provided with shoulders spaced from the core proper, with a ring having a downwardly extending flange adapted to rest on said frame adjacent to said shoulders when said core is horizontal, with the upper surface of the ring in position so that tire fabric may be stretched horizontally radially inwardly from the side of the core proper on said ring, and a bead templet gaging means on said ring for making it possible to conveniently set a bead directly above the bead line of the core.

Des Moines, Iowa, September 3, 1919.

PAUL I. ANDERSON.